UNITED STATES PATENT OFFICE.

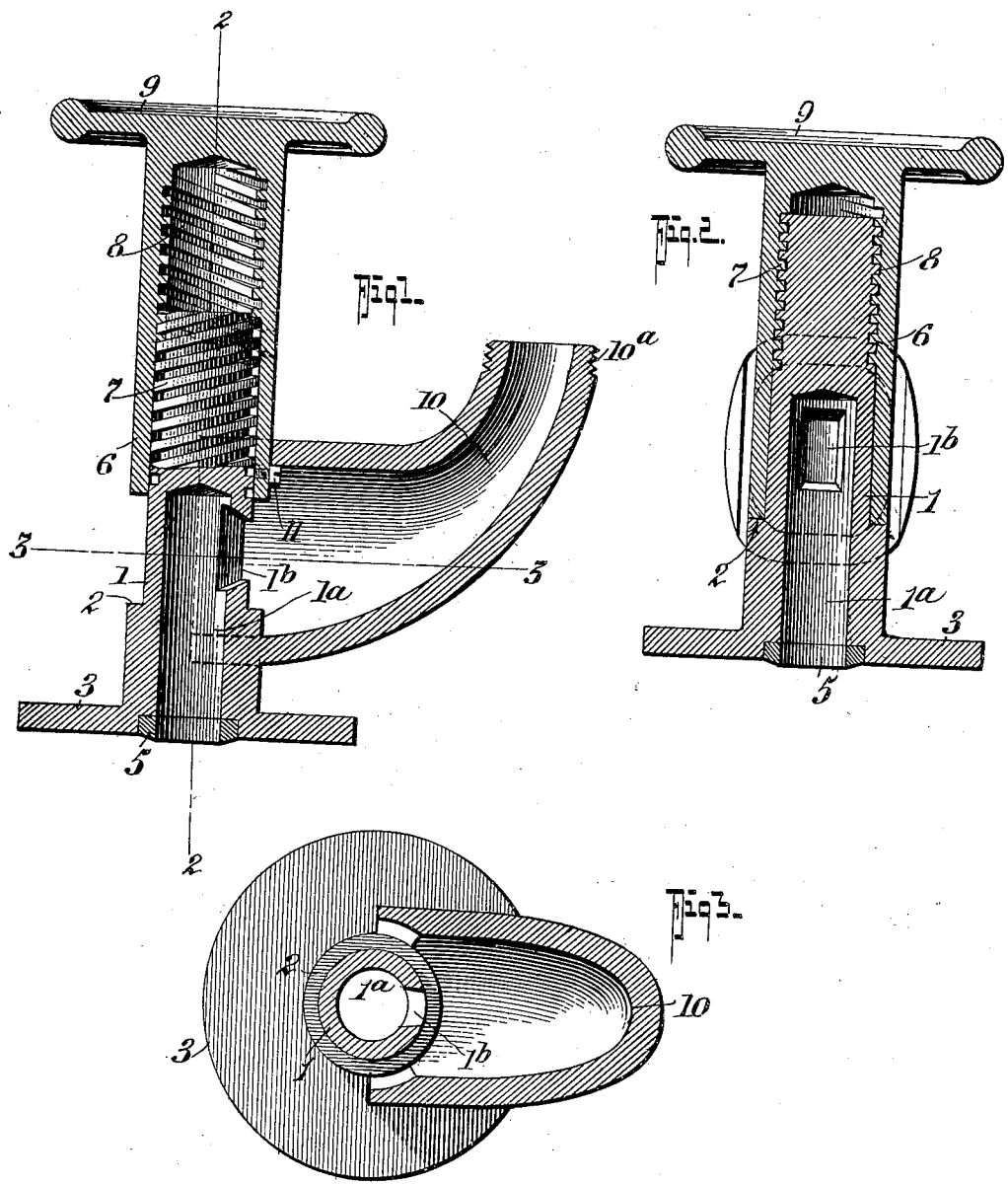

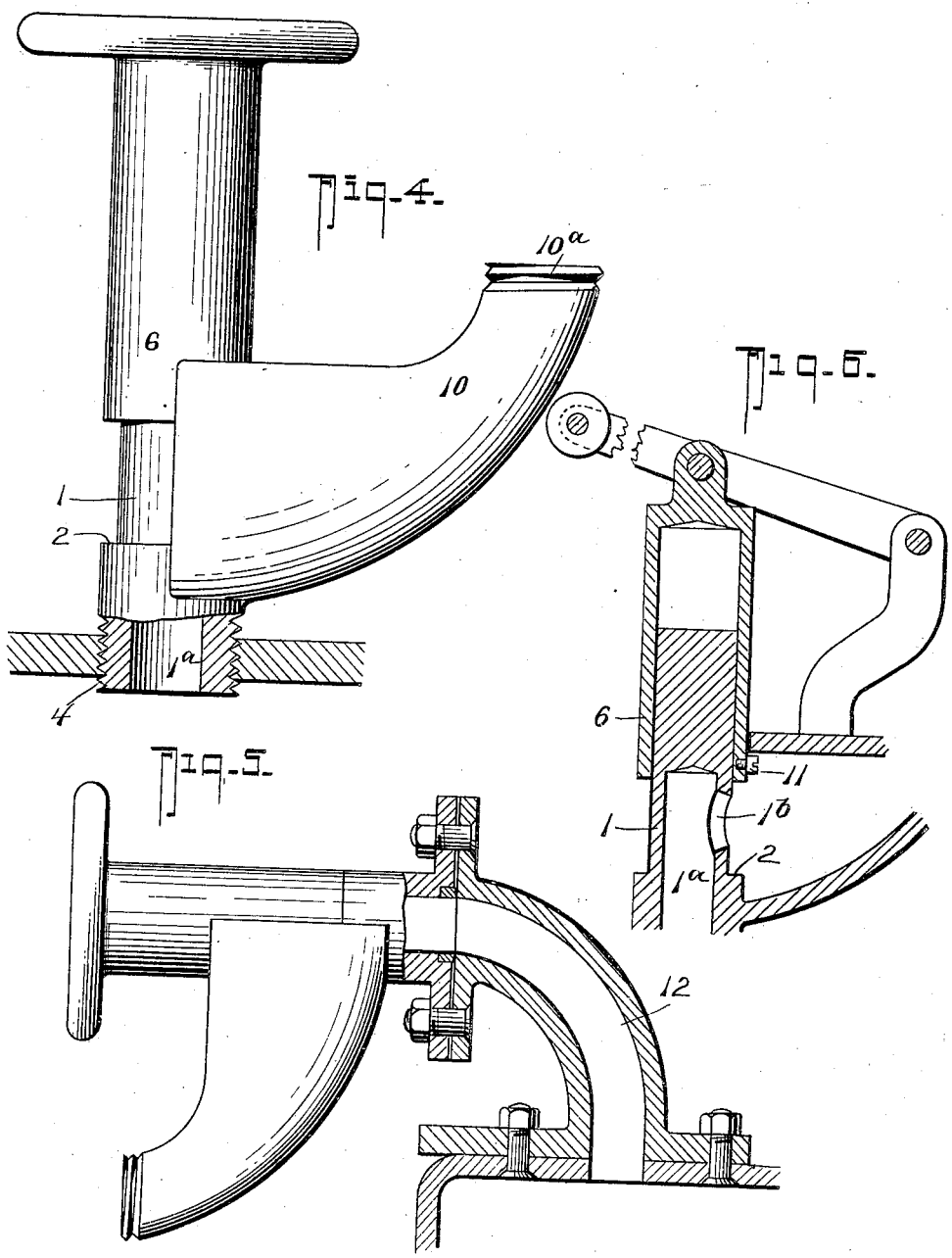

THOMAS WILLIAM LOWE, OF WINNIPEG, MANITOBA, CANADA.

VALVE.

No. 889,941.

Specification of Letters Patent.

Patented June 9, 1908.

Application filed September 24, 1907. Serial No. 394,360.

*To all whom it may concern:*

Be it known that I, THOMAS WILLIAM LOWE, residing at Winnipeg, Manitoba, Canada, have invented certain new and useful Improvements in Valves, of which the following is a specification.

My invention relates to certain new and useful improvements in valves of the blow-off, locomotive, globe, plug and gate types.
Heretofore it has been the practice to construct blow-off valves of a plug type in which the valve proper consists of a plug, through an aperture in which the water, steam, etc. passes when the plug is in one position, but when turned to another position the passage through the valve casing is closed.

Another kind of valve in common use, one of the globe type, has a valve casing whose passage is provided with a diaphragm having a valve seat on which a valve is adapted to be held seated by having its stem in threaded engagement with the casing.

Still another type of valve is in present use, and in this type, a sliding gate serves to close the passage through the valve casing at times.

In valves of the foregoing types, it will be observed, either their valves proper or seats, or both, are exposed to the action of water and impurities, etc., contained in the receptacles or boilers, when the valve is open or closed. It is impossible with these valves to remove the water or impurities from the boilers or receptacles, (particularly when subject to pressure), without injuring the valve or seat, due to impurities striking one or the other with force in their passage to the atmosphere, resulting in continual repairs, and renewals and rendering them expensive to maintain.

The pressure is always on the top of the valves, under them, or on one of their sides, which results in considerable force being exerted to open and close them, as well as the injury sustained thereby. Further, the extent of the bearing surface of the valves necessitates difficulty in opening. Again, when the valves or plug cocks are closed, with the contents of the boilers or receptacles cold, and then heated, they cannot be opened without injury, due to expansion. This also applies to closing the valves, as after intervals of blowing out the valves or cocks become expanded, due to extreme expansion, caused by the water and impurities passing through or around the valves, which valves only become partly expanded when closed, so that they become stuck when opened. All of the valves or cocks of the foregoing types when open, are subject to dirt or foreign matter passing from the boilers or receptacles and obstructing the openings, thus preventing closure, and sometimes resulting in a complete failure of a locomotive when operating over the line, as well as a shut down in manufactories.

Furthermore, all valves of the foregoing type are exposed to leaks from two or more joints, namely, the plug cock variety leak from top and bottom and at the opening, and the gate, globe and other valves leak from the openings and packing nuts. Mostly all of such valves have spindles which become bent and inoperative in endeavoring to close them against leaks.

My invention therefore primarily has for its object to provide a valve free from the foregoing objections, and which will permit the removal of the water and impurities from boilers and the like without injury to the valve or seat, and to so construct the valve and seat that they are not disposed in the passage-way of the water or impurities to the atmosphere.

Again, my invention has for its object to provide a valve requiring little or no effort in opening or closing the same and which will be free from interference in operation, due to the expansion and clogging.

In its generic nature the invention includes a valve having a telescopic engagement with its seat member, the seat member being tubular and having a side discharge port adapted to be closed when the tubular valve is telescoped thereover, a discharge spout coöperating to direct or convey the material from the discharge port.

The invention also includes certain novel details of construction, operation and arrangement of parts, all of which will be first described in detail, and then be specifically pointed out in the appended claims, reference being had to the accompanying drawings, in which:—

Figure 1, is a central vertical section of one form of my invention, showing the position of the parts with the valve open. Fig. 2, is a section on the line 2—2 of Fig. 1, the valve being closed. Fig. 3, is a horizontal section on the line 3—3 of Fig. 1. Fig. 4, is a side elevation and part section showing how my valve may be adapted to screw into a boiler plate or the like. Fig. 5, is a similar view showing how it may be connected horizontally instead of vertically. Fig. 6, is a central section showing the telescopic valve member operated by a lever in lieu of the screw threads, when so desired. Fig. 7, is a detail view of a modified form of my invention hereinafter specifically referred to.

Referring now to the accompanying drawings in which like letters and numerals of reference indicate like parts in all of the figures, 1 represents the inside stationary barrel of the valve which is provided with a seat 2, and whose lower end may be provided with a flange 3, as shown in Fig. 1, or may be threaded as at 4, as shown in Fig. 4. When provided with a flange 3, the end is machined to receive a ball ring 5, which serves as a washer. The barrel 1 is also machined to permit the valve barrel 6 to slide readily over it a portion of its length.

The stationary barrel 1 has its upper end double threaded as at 7 to engage the similarly threaded portion 8 of the valve barrel, a wheel 9 being formed in the valve barrel, by means of which it may be turned.

The trough or spout 10 forms an integral structure with the base of the stationary barrel, and extends over the discharge port 1$^b$ thereof, it being understood the barrel 1 has an internal passage 1$^a$ of which the rectangular port 1$^b$ forms an outlet. The spout 10 extends over the discharge port 1$^b$, as before stated, yet it is not attached to the valve barrel 6, but partly embraces the same, as shown in Fig. 3.

The purpose of the trough or spout 10 is to convey the water and impurities to any desired direction, and it may have its end threaded as at 10$^a$ to attach to a conveying or off-take pipe, (not shown) if so desired.

A set screw 11 may be provided to limit the opening movement of the valves, and prevent over opening of the same.

The hand wheel 9 may be integrally formed with the valve barrel 6 or separate therefrom, as shown in Fig. 7.

When from lack of head room or otherwise it is desirable to use the valve horizontally, an elbow or bent section 12 is interposed between the valve and the boiler, as shown in Fig. 5.

In Fig. 6, I have shown my valve as arranged to be operated by levers instead of screw threads, and when this form of my invention is used, the valve barrel and stationary valve have a straight telescopic or sliding action the one within the other.

The advantages of my invention permit of the removal of water and impurities from boilers or receptacles without injury to the valve or seat as they are not in the passage of the water or impurities to the atmosphere.

There is no pressure to influence the opening or closing of the blow-off cock. Expansion cannot interfere with its operation as perfect freedom can be arranged between the machining of the parts 1 and 6, thus assuring operation. Obstructions getting into the opening 1$^b$, when the barrel 6 uncovers it can be readily removed by closing the valve or with the assistance of a chisel pointed rod through the side of the trough 10. There is only one pipe subject to leakage which is at 2, and it is afforded good protection, due to its good location, it has no pressure against it when the barrel is open or closed, is less liable to become leaky, and when it becomes leaky from long service, it can be faced off quite conveniently on either barrel.

Thus it will be seen I have provided a valve which dispenses with a valve seat or joint in the passage between the boiler or receptacle and the atmosphere, and I have also eliminated the spindle and packing nut, all of which are very expensive and which get out of repair very easily.

My invention provides means whereby the removal of water and impurities from the boiler or receptacle to the atmosphere may be had without a break in its passage between the boiler and the opening of the blow-off cock and I thus provide an efficient and economical blow-off cock which is particularly adapted for locomotive boilers or receptacles of any description.

From the foregoing description taken in connection with the accompanying drawings it is thought the complete construction, operation and many advantages of my invention will be readily understood by those skilled in the art to which it appertains.

What I claim:—

1. A valve comprising a stationary cylindrical barrel having a valve port and a valve seat, of a movable cylindrical barrel telescopically held over said stationary cylindrical barrel and adapted to be moved over the discharge port therein to close the same, said cylindrical barrels having a threaded engagement with one another throughout a portion of their length, and a spout formed with the stationary barrel and coöperating with the outlet aperture thereof.

2. The combination with the stationary barrel, means for securing said barrel to a boiler or other receptacle, said stationary barrel having an internal chamber and an outlet port communicating therewith and provided with a seat, a movable barrel telescoping over said stationary barrel, and adapted to rest on said seat to close said port at times, means for telescopically moving said movable barrel along the stationary barrel, and an off-take spout formed with said stationary barrel to coöperate with the discharge port thereof, and partially embrace the movable barrel, substantially as shown and described.

3. The combination with the stationary barrel, means for securing said barrel to a boiler or other receptacle, said stationary barrel having an internal chamber and an outlet port communicating therewith and provided with a seat, a movable barrel telescoping over said stationary barrel, and adapted to rest on said seat to close said port at times, means for telescopically moving said movable barrel along the stationary barrel, an off-take spout formed with said stationary barrel to coöperate with the discharge port thereof, and partially embrace the movable barrel, and means for limiting the telescopic movement of such movable barrel in one direction.

4. The combination with the stationary barrel having a seat, and having a chamber within the same, and a valved port communicating with the chamber, of a movable barrel telescoping over the stationary barrel and having a portion to engage the seat thereof when in one position, said stationary barrel having a plain surfaced portion and a threaded portion, said movable barrel having corresponding plain and threaded surfaced portions, a turn wheel carried by such movable barrel, all being arranged substantially as shown and described.

5. The combination with the stationary barrel having a seat, and having a chamber within the same, and a valved port communicating with the chamber, of a movable barrel telescoping over the stationary barrel and having a portion to engage the seat thereof when in one position, said stationary barrel having a plain surfaced portion and a threaded portion, said movable barrel having corresponding plain and threaded surfaced portions, a turn wheel carried by such movable barrel, and an off-take spout formed with the stationary barrel and partially surrounding the movable barrel to coöperate with the discharge port of the stationary barrel, substantially as shown and described.

THOMAS WILLIAM LOWE.

Witnesses:
ROBERT PEEL,
HENRY R. SCRIMES.